United States Patent [19]

Ling

[11] Patent Number: 5,269,358
[45] Date of Patent: Dec. 14, 1993

[54] TIRE BEAD LOOSENING TOOL AND UNIVERSAL RIM ADAPTER

[75] Inventor: Jack A. Ling, Abingdon, Va.

[73] Assignee: Dotson Wheel Corporation, Saltville, Va.

[21] Appl. No.: 936,131

[22] Filed: Aug. 27, 1992

[51] Int. Cl.$^5$ .............................................. B60C 25/06
[52] U.S. Cl. ..................................... 157/1.17; 157/1.1
[58] Field of Search .............................. 157/1.1, 1.17

[56] References Cited

U.S. PATENT DOCUMENTS

| | | |
|---|---|---|
| 2,122,388 | 6/1938 | Wilkerson . |
| 2,520,330 | 8/1950 | Northrup et al. . |
| 2,548,033 | 4/1951 | Madden . |
| 2,606,602 | 8/1952 | Manupello . |
| 2,743,767 | 5/1956 | Martin . |
| 2,753,923 | 7/1956 | Bowyer ............................ 157/1.17 |
| 2,775,290 | 12/1956 | Mondaro . |
| 2,900,016 | 8/1959 | Woodward . |
| 2,901,029 | 8/1959 | Mraz . |
| 2,920,688 | 5/1960 | Lewis ............................... 157/1.17 |
| 3,344,833 | 10/1967 | Pile et al. . |
| 3,574,318 | 4/1971 | Gerbeth et al. . |
| 3,645,316 | 2/1972 | Verdier . |
| 3,880,220 | 4/1975 | Bunts ................................ 157/1.17 |
| 4,462,450 | 7/1984 | Robinson et al. . |
| 4,589,462 | 1/1986 | Giles ................................. 157/1.17 |
| 4,785,865 | 11/1988 | Folstad ............................. 157/1.17 |
| 4,913,770 | 4/1990 | Sims ................................. 157/1.17 |

FOREIGN PATENT DOCUMENTS

| | | | |
|---|---|---|---|
| 854322 | 11/1960 | United Kingdom ............... | 157/1.17 |
| 2071026A | of 1981 | United Kingdom . | |

Primary Examiner—James G. Smith

[57] ABSTRACT

A method for universally fixturing a tire bead loosening tool to a variety of standard off-road vehicle wheel rim configurations or designs and a radially and axially adjustable mounting apparatus for performing the method including a hook extending outwardly from a frame of the tool for interlocking with a tool mounting flange of the rim and an adapter carried by the tool for supporting the tool when mounted to the rim. The adapter has a first portion which is immovably affixed to or integral with a forward face of the tool frame, a second trunnion portion depends from the first adapter portion and a third swivel portion is pivotally carried by a pair of gudgeon arms of the trunnion. Each adapter portion has one or more threaded holes for threadably receiving a desired number of pressure bolts for supporting the tool when mounted. In use, the rim is surveyed and the adapter portion which provides the most stable tool support for such rim type is selected. An appropriate number (one or more) of bolts are inserted into the selected adapter portion before engaging the hook with the wheel rim mounting flange. To support the tool on the rim in a stable manner, the tool is rotated around the mounting flange until the head or end of each bolt generally stops against the outer axial surface of a base of the rim. Each bolt is rotatively adjusted until the longitudinal axis of the tool is generally parallel to the axis of rotation of the rim to direct an applied tire bead loosening force from the tool generally inwardly against a tire bead retaining flange of the rim to loosen a tire bead from the rim for removal.

14 Claims, 4 Drawing Sheets

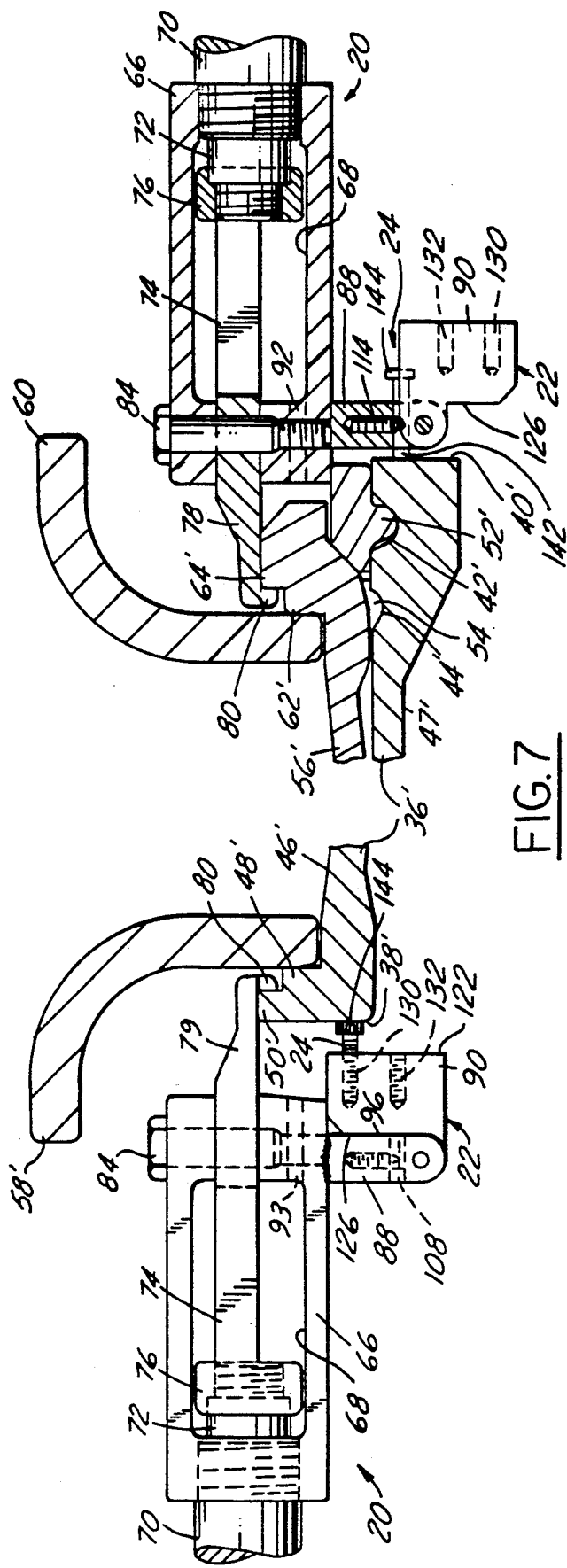
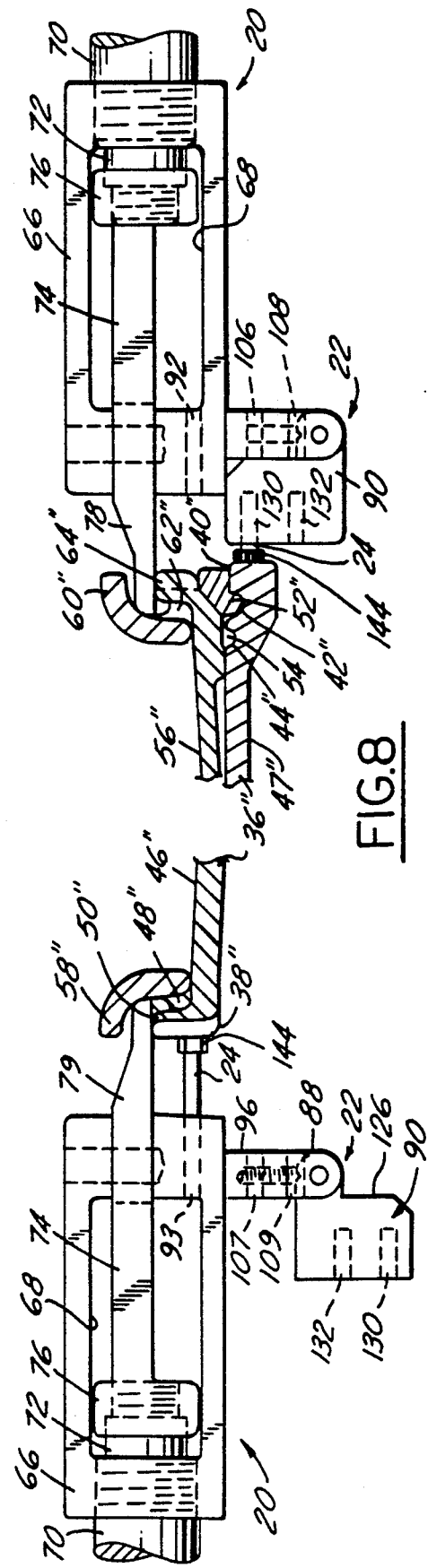
FIG.7
FIG.8

TIRE BEAD LOOSENING TOOL AND UNIVERSAL RIM ADAPTER

FIELD OF THE INVENTION

The present invention is directed to vehicle wheel rims and more particularly to an apparatus for loosening the bead of a tire mounted on a rim. The invention also relates to tire bead loosening devices of the type used to dismount tires from off-road type vehicle wheel rim assemblies.

BACKGROUND OF THE INVENTION

In the repair and replacement of large tire and rim assemblies, such as the kind used in off-road heavy equipment, it is usually necessary to use considerable force to dislodge the tire beads from the rim to remove the tire. In the early stages of development in this art, hand tools such as a prybar and mallet were used to forcibly loosen the tire bead. However, not infrequently, use of such tools was time consuming and resulted in damage to the tire wall or rim assembly.

As the size of tire and wheel assemblies have increased, a significant number of specialized pneumatic, hydraulic or manual bead loosening tools have been introduced. Representative of these specialized tools are Northrup et. al. U.S. Pat. No. 2,520,330; Woodward U.S. Pat. No. 2,900,016; Pile et. al. U.S. Pat. No. 3,344,833; and Bunts U.S. Pat. No. 3,880,220. These patents disclose tire bead loosening tools which employ a means to fixture the tool to the rim and a pressure foot or plunging member to apply force against the tire wall or tire bead retaining flange to loosen the tire bead. An adapter for mounting a bead loosening tool to a normally incompatible rim construction is disclosed in Robinson et al U.S. Pat. No. 4,462,450.

The aforementioned tools conventionally employ various means to fixture the tool to the wheel rim. In the Northrup '330 patent, the fixturing means is comprised of a simple clamping mechanism. To mount the tool to the one-piece tire rim, a spaced-apart pair of hooks integral with the tool is placed between the inner rim and tire bead. A long-handled, resiliently-padded, pivotally connected member is then rotated downwardly with the resilient pad abutting against the axially outer surface of the rim tightly gripping the rim between the pad and the hooks. The clamp also functions to position the tool so that the applied plunger force is directed generally inwardly against the tirewall to loosen the bead from the rim. However, without the application of a considerable amount of manual force to the clamp handle during use, the clamp may loosen and disengage from the rim. Additionally, undesirable and potentially dangerous bodily pivotal tool movement during operation is possible because of an unrestrained moment created around a pivot point formed where both hooks engage the rim. Finally, lack of significant axial and radial adjustment limits the commercial application of this tool to primarily unitary rims of simple construction.

Woodward '016 discloses a tool with fixturing means comprising two pairs of spaced apart, opposing chisel-pointed rim clamp jaws for mounting the tool to the tire bead seat retaining flange of a wheel rim and a pivotable and adjustable T-handled screw for stopping against the lock ring of the rim for preventing tool rotation during operation A pair of screws in communication with both jaws are provided to engage and disengage the jaws from the tire bead seat retaining flange. A serious drawback of this design lies in the moment created around the T-screw point of contact with the lock ring, resulting in considerable force attempting to pull the clamp jaws off the rim. Any decrease in retaining flange surface friction or jaw clamping force can result in sudden, dangerous, potentially catastrophic clamp jaw disengagement. The mounting mechanism of this tool also lacks sufficient axial and radial adjustment for fixturing the tool to a wide range of off-road vehicle wheel rims.

In Pile '833, the fixturing means comprises a spaced apart pair of hooks engaging a corresponding pair of U-shaped brackets weldably attached to both tire bead seat retaining flanges of one type of wheel rim. To loosen the tire bead from the rim, the hooks are inserted into the U-shaped brackets and the spade-tipped plunger is manually positioned with its end directed into the crease between the tire sidewall and the bead seat retaining flange directly engaging the sidewall. Affirmative interlocking of the hooks with the brackets is provided by outwardly extending the spade-tipped plunger until it forcibly contacts the tire side wall. However, during use, the tool can pivot bodily, causing the hooks to disengage and injure the operator. Such tool movement may also change the plunger force direction thereby frustrating efforts to loosen the tire or even resulting in damage to the tire wall or wheel rim assembly. Finally, this tool is only adaptable to rims with U-shaped brackets mounted around the outer radial periphery thereon or, at best, with a very limited range of rim assemblies having specifically conforming mounting flanges A bead loosening tool for use with a specific off-road-vehicle-wheel rim configuration is disclosed in Bunts '220. To mount the tool, a pair of spaced-apart hooks engage an annular offset of the rim and one end of a bolt carried by the tool abuts against the axially outer face of the rim base or a removable bead seat band to prevent bodily tool rotation during use. Unfortunately this tool is not sufficiently axially nor radially adjustable with respect to the rim assembly for use on a great number of rim configurations.

Also relevant because of its ability to adapt an existing bead loosening tool for mounting the tool on a normally incompatible rim design is the tire bead loosening tool mounting adapter found in U.S. Pat. No. 4,462,450, Robinson et al. Robinson, et al '450 discloses an adapter plate to enable an existing tire bead loosening tool, without modification, to be mounted on a type of off-road vehicle wheel rim configuration having at least one tapered axially outer rim base surface.

Thus, although the aforementioned tire bead loosening tools and mounting adapter having been successfully built and used on various wheel rim configurations, certain problems nevertheless remain, such as poorly designed clamping or fixturing means generally providing poor reaction support to the tool while fixtured to the rim, rather loose engagement of the tool with the rim, and unacceptable radial and axial fixture adjustment limiting adaptability to generally only one type of rim configuration. Poor or inadequate reaction support can cause sudden, undesirable, or unsafe bodily tool movement during use, possibly damaging the wheel rim, puncturing the tire wall or seriously injuring the user. Loose or unstable engagement with the wheel rim can force the tool to suddenly disengage, again producing injurious conditions for the user. Finally, the limited adaptability of these tools to new and different rim designs results in expensive and undesirable tool obsolescence as new and improved rim designs are introduced into the market place.

SUMMARY OF THE INVENTION

The present invention is directed to a tire bead loosening tool with an adjustable apparatus for suitably mounting the tool to a wide variety off-road or heavy equipment vehicle tire and rim assemblies. The mounting fixture includes a hook member which extends outwardly from the tool frame to securely engage a prybar pocket or a tool mounting flange of the rim assembly. A radially and axially adjustable adapter is carried by the tool frame for positive, yet releasable, attachment of the tool to a wheel rim. One or more bolts carried by the adapter abut against the axially outer surface of the rim base to prevent unsafe bodily tool movement during use.

The adapter is comprised of first, second and third adapter portions. The first adapter portion is immovably affixed to the forward face of the tool frame and has one or more threaded openings for individually threadably receiving one or more pressure bolts for mounting the tool to rims with tire bead retaining flanges generally proximal to the rim base. Each bolt is rotatively adjusted until the its end forcibly seats on the axially outer surface of the rim base, thereby drawing the hook into light clamping engagement with the mounting flange, and forming a tripod-like reaction support for the tool when in use to prevent bodily pivotal motion of the tool.

The second adapter portion depends from the underside of the tool frame and is located back from the forward frame face. The forward face of the second adapter portion has at least one, and preferably two, sets of two threaded throughbores for threadably receiving one or more pressure bolts for mounting the apparatus to rims with the outer axial surface of the rim base axially forward from and radially distant from the mounting flange. When utilizing this adapter portion for fixturing the tool to a rim, each bolt is adjusted until its end abuts against the axially outer surface of the rim base, drawing the hook into light clamping engagement with the mounting flange, directing the demounting force of the plunger inwardly and generally parallel to the axis of rotation of the wheel rim, and forming a tripod reaction support to prevent tool rotation during use.

The third adapter portion is pivotally connected to the free end of the second adapter portion remote from the frame. The pivotal connector has a detent mechanism for releasably holding the third adapter portion against the forward face of the second adapter portion when in use and for releasably retaining the third adapter portion in an out-of-the-way position when the first or second adapter portion is in use. When held upwardly in an operative position against the second adapter portion, the forward face of the third adapter portion also has at least one and preferably two threaded openings for threadably receiving one or more pressure bolts for mounting the apparatus to rims with mounting flanges radially distant from and having an outer axial surface substantially coplanar with the outer axial surface of the rim base. When utilizing this third adapter portion for fixturing the tool to a rim, each bolt is adjusted until its end contacts the rim base, drawing the hook into locking engagement with the mounting flange, properly directing the tool demounting force, and providing a reaction support to prevent the tool body from pivoting during use.

In the preferred embodiment of the invention, the tire bead loosening tool and mounting apparatus comprises a frame, open at both ends and with a hollow longitudinal guideway therein. A generally U-shaped plunger member or clevis, having a base and bifurcate spaced apart arms extending therefrom, is reciprocatingly, slidably, disposed within the guideway with its arms extending out one end of the frame for applying a demounting force against an annular tire bead retaining flange of a wheel rim in a direction generally parallel to the axis of rotation of the rim. A hydraulic or pneumatic ram is attached at the opposite end of the frame with a piston extending therefrom and coupled to the clevis. The hook is attached to the frame between the plunger arms and protrudes from the frame for interlocking with the prybar pocket or mounting flange on a rim assembly. The first, second, and third adapter portions are located below the hook member and provide a plurality of threaded openings to receive mounting bolts for serving as anti-pivot supports at differing locations relative to the rim base to draw the hook into locking engagement with the mounting flange to mount the tool on the rim in a stable manner.

In use, a worker grasps the tool, inserting the hook into the tool mounting flange of the rim assembly thereby positioning the longitudinal axis of the tool frame generally parallel to the wheel rim axis of rotation with the clevis arms of the tool facing the tire bead retaining flange of the rim assembly. After examining the rim, the proper adapter portion is selected and each pressure bolt mounted on the selected adapter portion is rotatably adjusted until its free end forcibly seats against the rim base, drawing the hook into light clamping engagement with the mounting flange. The hydraulic or pneumatic ram is then actuated, driving the clevis arms inwardly, generally parallel to the wheel rim axis of rotation, against the tire bead retaining flange, thereby loosening the tire bead from its bead seat, enabling quick and easy tire removal.

BRIEF DESCRIPTION OF THE DRAWINGS

The invention, together with additional objects, features and advantages thereof, will be best understood from the following detailed description, the appended claims and the accompanying scaled drawings, in which:

FIG. 7 is a fragmentary radial cross-sectional view of a type EHD wheel rim configuration with a pair of the tire bead loosening tools mounted, one on each side of the rim.

FIG. 8 is a fragmentary radial cross-sectional view of a type HT wheel rim configuration with a pair of the tire bead loosening tools mounted one on each side of the rim.

DETAILED DESCRIPTION OF THE INVENTION

In the following description and claims, directional adjectives such as "inboard" and "outboard" are taken with reference to a preferred orientation of mounting the wheel, etc., on a vehicle, and no undue limitations should be inferred therefrom, and where such directional adjectives are not essential to operation of the structural and functional features of the invention.

Figure 1:
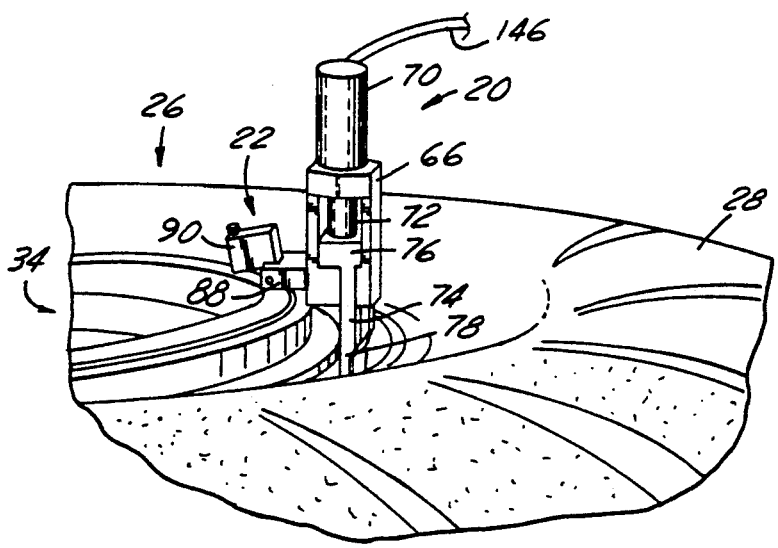
FIG. 1 is a fragmentary outboard perspective view of a typical off-road wheel rim with a tire mounted thereon, and depicting an embodiment of a tire bead loosening tool with the universal rim adapter apparatus of the invention mounted thereon.
Figure 2:
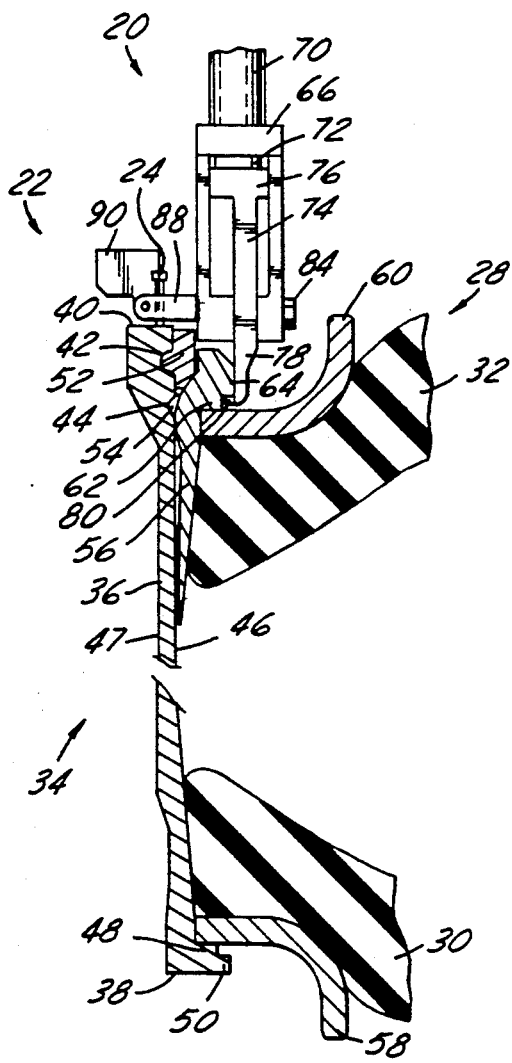
FIG. 2 is a fragmentary radial cross-sectional view of a type EHD wheel rim and associated tire with the tire bead loosening tool mounted on the outboard side of the rim, pressure bolts being shown extending through the lower stationary second adapter portion and engaging the outboard rim base to fixture the tool to the rim.
Figure 3:
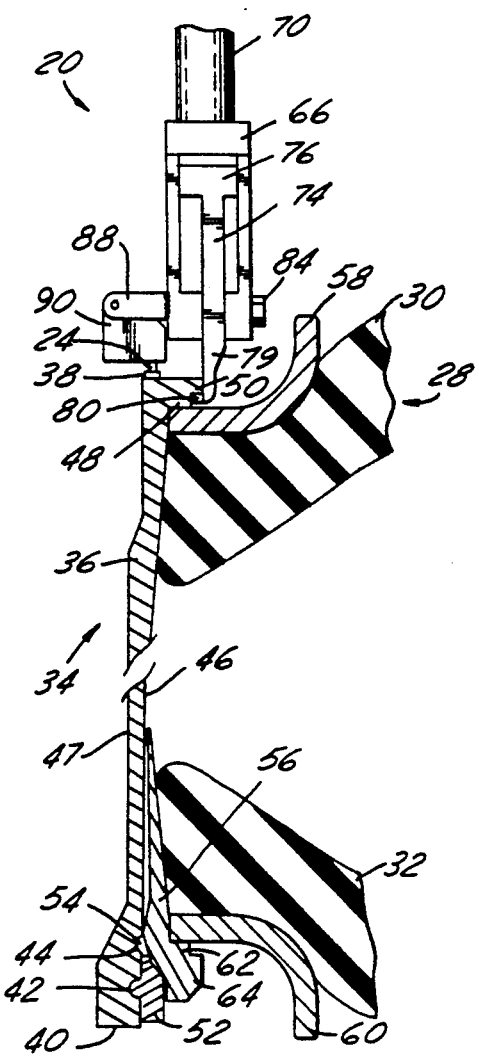
FIG. 3 is a fragmentary radial cross-sectional view of the wheel rim and tire of FIG. 2, with the rim and tire inverted from the view of FIG. 2, and with the tire bead loosening tool mounted on the inboard side of the rim, pressure bolts being shown extending through the hingedly movable third adapter portion and engaging the inboard rim base to properly fixture the tool to the rim.

FIGS. 1-3 illustrate an exemplary but presently preferred embodiment of a tire bead loosening tool 20 provided with a universal rim adapter 22 in accordance with the present invention, mounted by one or more pressure bolts 24 on a tire and rim assembly 26. The tire and rim assembly 26 comprises a pneumatic tire 28 mounted by its inboard 30 and outboard 32 tire beads to an off-road type vehicle wheel rim assembly 34.

The rim 34 is further comprised of a cylindrical rim base 36 having an inboard 38 and an outboard 40 axial end, a lock ring groove 42 and an 0-ring groove or cavity 44 in the outer circumferential surface 46 adjacent the outboard end 40, and the inboard end 38 forming a retaining flange 48 having a radially upwardly stepped prybar or bead loosening tool mounting flange 50.

Coaxially carried by the rim 34 is a lock ring 52 removably received within groove 42, an annular sealing member 54, such as an elastomeric 0-ring, removably seated within the second groove 44, a cylindrical bead seat band 56, and removable inboard 58 and outboard 60 tire bead retaining flanges. Tire bead retaining flanges 58 and 60 are also commonly known in the trade as side flanges. The cylindrical bead seat band 56 has a retaining flange 62 for retaining the outboard side flange 60, and a radially upwardly stepped tool mounting flange 64 and is mounted adjacent the outboard axial end 40 of the rim base 36 such that it sealingly engages with the 0-ring 54 The inboard 58 and outboard 60 side flanges are mounted on the rim base 36 respectively adjacent the inboard 38 and outboard 40 axial ends with the axially outer surfaces of the side flanges 58, 60 abutting respectively against retaining flanges 48, 62. The tire 28 is coaxially carried on the outer circumferential surface 46 of the rim base 36, with the inboard 30 and outboard 40 tire bead sidewalls abutting respectively against the inner radial surfaces of the side flanges 58, 60.

Referring additionally to FIGS. 4-7, the tire bead loosening tool 20 includes a frame 66 open on both ends with a central hollow portion forming a guideway 68 therein. A generally cylindrical, preferably hydraulic, or pneumatic, actuator 70, with a piston 72 at one end, is threadably attached to one end of the tool frame 66. A generally U-shaped plunging member, or clevis 74, having a base 76 is threadably attached to the actuator piston 72, and bifurcate spaced apart arms 78 and 79 extending therefrom, is reciprocatingly slidably disposed within the guideway 68. A hooking member 80, having a generally downturned lip 82, is located between the plunger arms 78, 79 and attached at one end to the frame 66 by a bolt 84. A prior art tool generally embodying the structure thus far described is the TO-1600 bead breaking tool distributed by Dotson Wheel Corporation of Saltville, Va.

Figure 5:
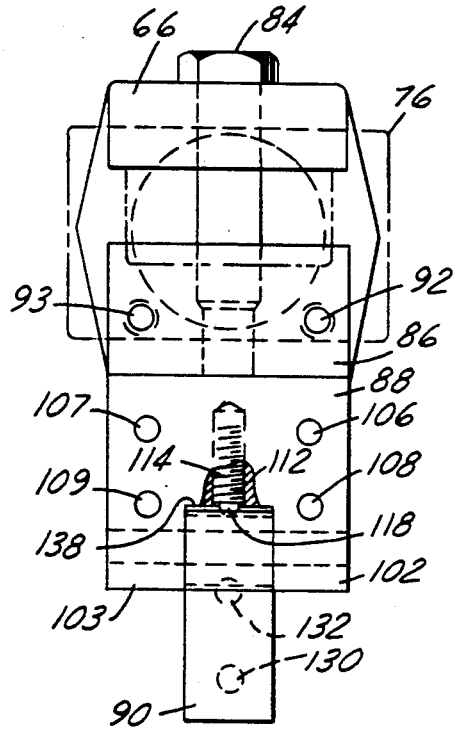
FIG. 5 is a frontal elevational view of the tire bead loosening tool with plunger and hook parts omitted for clarity.
Figure 6:
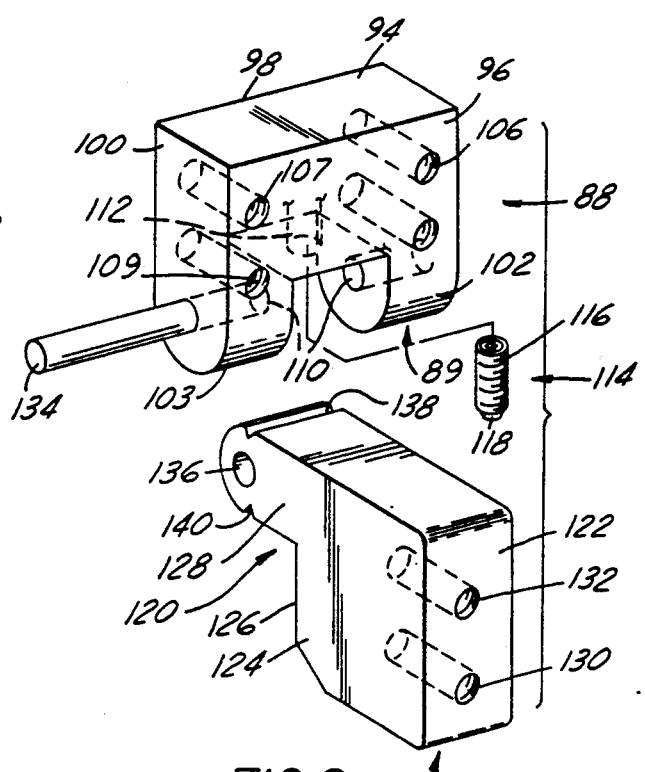
FIG. 6 is an exploded perspective view of the second and third portions of the adapter apparatus shown by themselves.

Depending from frame 66, and shown in more detail in FIGS. 5 and 6, is the rim mounting adapter 22. The adapter 22 is comprised of first 86, second 88 and third 90 adapter portions arranged in a tiered fashion to accommodate mounting the tool 20 to various wheel rim configurations.

Figure 4:
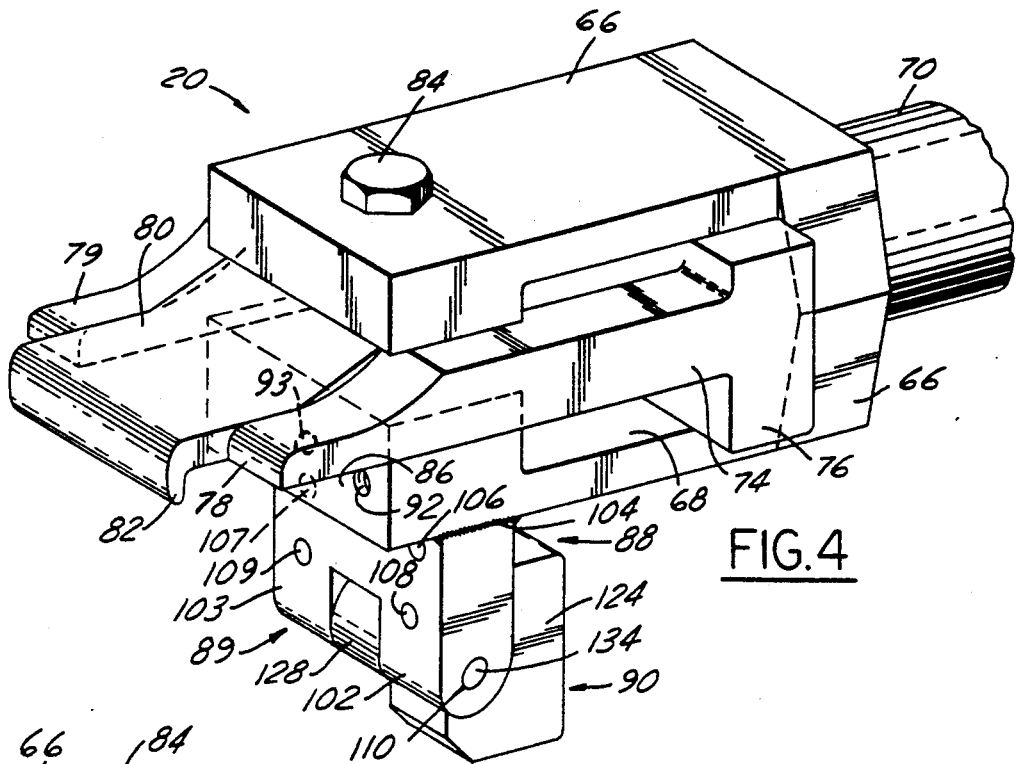
FIG. 4 is a fragmentary perspective view of the tire bead loosening tool showing the plunger in a fully retracted position.

The first adapter portion 86 is immovably affixed to the rimward face of the frame 66 adjacent the hook 80 and clevis arms 78, 79, and contains a pair of threaded openings 92, 93 for receiving one or more pressure bolts 24. Preferably, the first adapter portion 86, including openings 92, 93 is integral with the frame 66 of the tool 20 as illustrated in FIG. 4. The axes of openings 92, 93 extend parallel to the longitudinal axis of the clevis 74 to direct each bolt 24 against the axially outer surface of the rim base 36 to mount the tool 20 with the clevis 74 axis aligned generally parallel to the axis of rotation of the rim 34. The spacing of openings 92, 93 from hook 80 radially of the wheel rim 34 is predetermined so bolts 24 align on wheel rims of the RW type generally having the inboard axial end 38 radially proximal and substantially axially coplanar to the tool mounting flange 50.

The second adapter portion 88 is a trunnion member 89 having a generally rectangular top 94, a rimward facing front face 96, a rear face 98, two side faces 100, and two spaced apart gudgeon arms 102, 103 at the bottom. The adapter portion 88 is preferably weldably attached to the underside of the frame 66 by a fillet weld 104 extending substantially along the periphery of the top 94. It is also within the contemplated scope of this invention to cast the second portion 88 integral with the frame 66. A top pair 106, 107 and a bottom pair 108, 109 of two pairs of threaded through-bores are arranged in trunnion 89 in a rectangular pattern opening to the front face 96 of trunnion 89 for receiving at least one, and preferably two, threaded pressure bolts 24 per pair. In use, two bolts 24 are mounted in either the top 106, 107 or bottom 108, 109 pair of bores. The spacing of the axes of bores 106, 107 and 108, 109 from hook 80 radially of the wheel rim 34 is predetermined to align the associated pressure bolts to seat against the radially extending face end 40 of the rim base 36 giving the tool 20 tripod-like reaction support when mounted to a type EHD wheel rim. The gudgeon arms 102 are generally hemispherically shaped on the end and each have a journal bore 110 extending laterally therethrough with the bores 110 in coaxial alignment. A single threaded blind hole 112 interjacent the arms 102 extends longitudinally within trunnion 89 with its axis perpendicular to and intersecting the axes of bores 110 for threadably receiving a spring plunging unit 114. The spring plunger 114 may be of standard construction with a set screw head and body 116 and a spring-biased nose 118 at the end, and is preferably a Model 1386 standard spring plunger or Model 1388 short spring plunger unit distributed by Wholesale Tool of Warren, Michigan.

The third adapter portion 90 comprises a generally L-shaped swivel member 120 having a front face 122, two side faces 124, a rear face 126, and a substantially right-angled, hemispherically-end-shaped arm 128 extending therefrom. The front face 122, when oriented for tool mounting support, has upper and lower threaded openings 130 and 132 individually for receiving and supporting at least one pressure bolt 24 against the radial end face at an axial end 38 of the rim base 36 to provide reaction support to tool 20 (FIG. 3). The third portion 90 is hingedly attached to the second portion 88 by a pivot pin 134 extending through both an opening 136 in the arm 128, and the openings 110 in the bifurcate arms 102. A first detent groove 138 runs laterally across the hemispherical face of the arm 128 for receiving the nose 118 of the spring plunger 114 to releasably detent the third adapter portion 90 in a generally out-of-the-way-position (FIS. 2, 4) when the first or second adapter portions 86 or 88 are being used to mount tool 20. A second detent groove 140 runs laterally across the face of the arm 128, substantially offset 180° from the first groove 138, for releasably locking the third portion 90 upwardly such that the rear face 126 is braced against the forward face 96 of the second portion 88 (FIG. 3). In this operative position of swivel 120, the forward face 122 is brought closer to the rim center line to thereby adapt tool 20 for bead demounting fixturing to type EHD, HT and RW wheel rims having a tool or prybar mounting flange 64 substantially coplanar with the outer axial surface of the rim base 36.

In use, FIGS. 1, 2, 3 and 7-9 illustrate the adapter 22 of this invention fixturing the tool 20 to three typical rim configurations. Before mounting, the operator (not shown) surveys the rim 34 to select the adapter portion which best fits the contour of the rim 34 and which enables one or more selected pressure bolts 24, when inserted into the adapter portion, to stably contact that part of the outer axial edge of the rim base 36 furthest remote (in a direction generally radially inwardly of the wheel) from where the hook 80 interlocks with the tool mounting flange 64 to thereby provide stable reaction support to tool 20 during use. After the selected pressure bolt 24 is inserted into the desired opening on the selected adapter portion, tool 20 is manually mounted on the rim 34 by first interlocking lip 82 of hook 80 with the tool mounting flange (50 or 64, etc.), and then tool 20 is bodily pivoted toward and generally into parallelism with the wheel axis until the end 142 or head 144 of the selected bolt 24 rests upon the radially extending face 38 or 40 of the associated outer axial end of the rim base 36. To properly align the tool 20 on the rim 34, the selected pressure bolt 24 is rotatively extended or retracted until the axis of the clevis 74 is generally parallel to the axis of rotation of rim 34 so that the demounting force from both clevis arms 78 is directed axially and inwardly of the wheel rim against the desired side flange of the rim to safely and efficiently loosen the tire bead from its seat. When properly fixtured, each bolt 24 seats against the rim base 36 as far as possible distal from where hook 80 engages with the mounting flange to provide a stable reaction support to prevent bodily pivotal motion of the tool 20 while also properly fixturing tool 20 to direct the demounting force axially inwardly against the side flange to efficiently demount the tire. This adaptive fixturing also precludes sudden potentially injurious hook disengagement.

More particularly, FIG. 7 demonstrates adapter 22 alternately conditioned for fixturing a pair of tools 20, one to the outboard and the other to the inboard sides of a wheel rim 34' representative of an "EHD" style wheel rim, manufactured and sold under the trademark "Sur-Loc"® as an off-road vehicle wheel rim by Dotson Wheel Corporation of Saltville, Virginia.

To fixture tool 20 to the outboard side of rim 34' (right hand half of view of FIG. 7), the third adapter portion 90 is rotated upwardly until nose 118 of the spring plunger 114 engages groove 132, thereby detenting the adapter portion 90 in a retracted, out-of-the-way-position. Two pressure bolts 24, oriented with their ends 142 facing toward rim 34', are individually threaded through openings 108, 109 on the second adapter portion 88. Tool 20 is manually positioned adjacent rim 34' and lip 82 of hook 80 is interlocked with the mounting flange 64' of the bead seat band 56'. Tool 20 is then bodily pivoted around the fulcrum point created where hook 82 interlocks flange 64' until the end 142 of each bolt 24 abuts the outer axial end face 40' of rim base 36'. Each bolt 24 is rotatably extended or retracted a proper amount, such as with a hex head wrench (not shown) engaging the head 144, until tool 20 is stably supported in a tripod-like fashion on the rim 34' with the longitudinal axis of clevis 74 generally parallel to the axis of rotation of rim 34' for directing the tire bead demounting force directly against the outboard side flange 60' and parallel to the wheel rim axis.

During operation, pressure fluid supplied to actuator 70 through hose 146 forces piston 72 to propel clevis 74 against the outboard side flange 60'. As the pusher clevis 74 contacts flange 60', a reaction force develops between hook 74 and mounting flange 64' opposite the direction of clevis 74 movement, firmly locking tool 20 on the rim 34'. Due to the moment arm spacing between the applied force and reaction force, a tool bodily pivoting torque is developed, but bodily pivotal movement of the tool rotation is also prevented by the tripod stability of the hook 80 interlocking flange 64', the clevis 74 contacting the outboard side flange 60', and the bolts 24 contacting the outer axial end 40' of the rim base 36' at two points distal the hook-flange interface. As a result of the static support given the tool 20 by the adapter 22, bodily tool rotation or pivoting is prevented while the pusher clevis 74 is directed at a proper angle generally parallel to the rim axis of rotation and perpendicular to the plane of the outer axial surface of the side flange 60' to effectively and safely loosen the outboard tire bead 32 from its seated position on the outer circumferential surface 46' of the rim base 36'.

In fixturing the tool 20 to the inboard side of the rim 34' of FIG. 7 (see left hand half of view of FIG. 7), the third adapter portion 90 is detented upwardly into position with its rear face 126 braced against the front face 96 of the immovable second portion 88. A single bolt 24 is inserted into the upper opening 130 with its head 144 facing outwardly. The lip 82 of the hook 80 is inserted into the groove behind the tool mounting flange 50' and the tool 20 is rotated until the head 144 of the bolt 24 rests upon the outer axial edge face 38' of the rim 34'. While supportably resting on the rim 34', the bolt 24 is adjusted to lightly clamp the hook lip 82 against the flange 50' and to position the axis of clevis 74 generally parallel to the axis of rotation of rim 34' to direct the demounting force generally perpendicular to the plane of the outer axial surface of inboard side flange 58'.

FIG. 8 illustrates the tool 20 alternately fixtured by adapter 22 to both the inboard and outboard sides of a wheel rim 34" representative of an "HT" style of Dotson Wheel manufacture. When fixturing the tool 20 to the outboard side of the rim 34" (see right hand half of view of FIG. 8), the third adapter portion 90 is selected and detented upward for use because the outer axial end 40" of the rim base 36" is generally coplanar with and axially remote from tool mounting flange 64". To provide a stable point of contact with the narrow outer axial end face 40" of the rim base 36" as far as possible remote from where the hook 82 engages with the flange 64" a single pressure bolt 24 is mounted, head 144 facing outwardly, in the upper opening 130 of the adapter 90.

The first adapter portion 86 is used to mount the tool 20 to the inboard side of the rim 34" (see left hand half of view of FIG. 8) because the inner circumferential surface 47" of the rim base and rather narrow outer axial end face 38" are proximal to the point where the hook lip 82 interlocks with the inboard mounting flange 50". Two bolts 24 are mounted individually in threaded holes 92 and 93 and threadably adjusted with their heads 144 outwardly contacting the outer axial edge 38" of the rim base 36" to provide stable, tripod-like reaction support to the tool 20.

Figure 9:
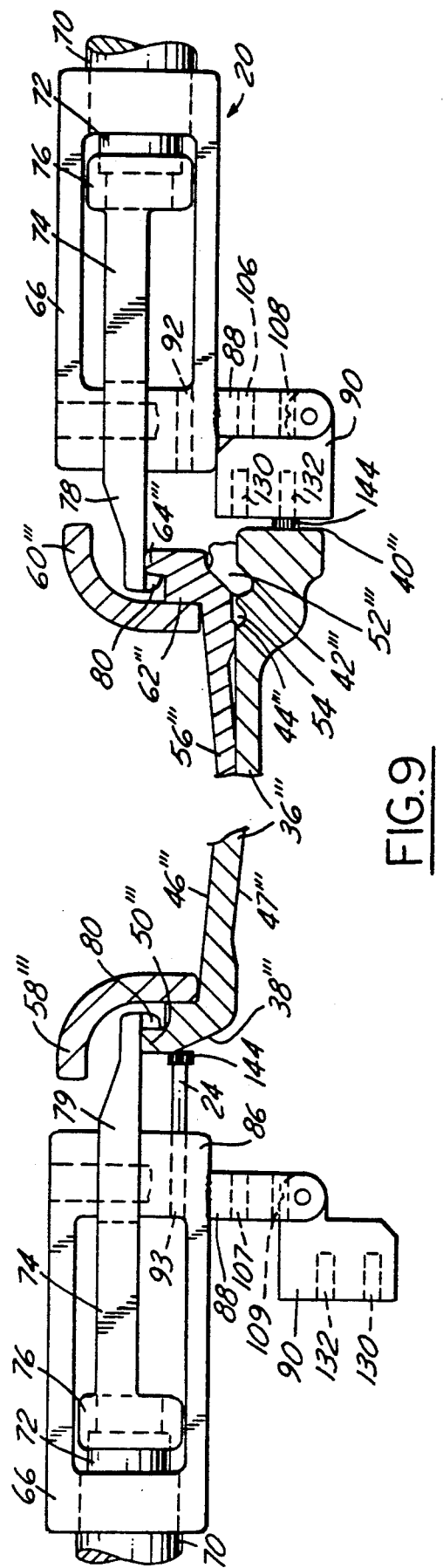
FIG. 9 is a fragmentary radial cross-sectional view of a type RW wheel rim configuration with a pair of the tire bead loosening tools mounted one on each side of the rim.

FIG. 9 illustrates the tool 20 alternately fixtured to a third rim configuration 34'" representative of an 'RW' style off-road vehicle wheel rim of Dotson Wheel Corporation manufacture. The lower opening 132 is used in the third adapter portion 90 to receive a bolt 24 to mount the tool 20 to the outboard side of the rim 34'" (see right hand half of view of FIG. 9) because the outer axial edge face 40'" of the rim base 36'" is generally radially in line with and axially remote from the outboard mounting flange 64'". A bolt 24 is installed in the opening 132 radially furthest remote from the flange 64'" to provide a stable point of contact on the outer axial end face 40'" of the rim base 36'". The wide distance between the bolt 24 contact point and the mounting flange 64'" effectively counteracts a tool rotation-inducing moment created around the point where the hook lip 82 interlocks with the flange 64'" when the clevis arms 78'" press against the outboard side flange 60'".

In loosening the inboard tire bead retaining flange 58'" (see left hand half of view of FIG. 9), two bolts 24 are received in the openings 92, 93 on the first adapter portion 86 before the tool is mounted to the rim 34'". The first adapter portion 86 is used with this rim configuration because the outer axial face 38'" of the rim base 36'" is radially proximal to and substantially coplanar with the outer axial surface of inboard tool mounting flange 50'". The two openings 92, 93 are separated to provide two points of contact between the screws 24 and the rim base 36'" to provide extremely stable, tripod-like reaction support during bead loosening.

It is also to be understood that, although the foregoing description and drawings describe and illustrate in detail successful working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

I claim:

1. A tire bead loosening tool for loosening a bead of a tire from a rim assembly comprising;
   a frame;
   pushing means operatively associated with said frame for transmitting a force to loosen the bead of the tire from the rim assembly;
   actuating means carried by said frame and operatively connected to said pushing means for supplying a motive force to said pushing means;
   a hook carried by said frame for engaging with the rim to mount the tool on the rim assembly; and
   support means carried by said frame and constructed and arranged to be axially and radially adjustable with respect to a rim assembly when mounted on a rim assembly for supporting the tool in a stable manner to prevent bodily tool pivoting, hook engagement or slippage during use, said support means comprising:
   a first adapter portion carried by said frame and adjacent said hook, at least one threaded hole in said first adapter portion constructed and arranged so that the axis of said at least one hole of said first adapter portion is generally axially parallel to the axis of rotation of the wheel rim when the tool is mounted on the rim assembly for mounting and supporting the tool on rim assemblies with a tool mounting flange generally proximal to and substantially coplanar with the outer axial surface of a base of the rim assembly,
   a trunnion adapter portion carried by said frame, at least one threaded hole in said trunnion portion constructed and arranged so that the axis of said at least one hole of said trunnion adapter portion is generally axially parallel to the axis of rotation of the wheel rim and said one hole of said trunnion portion is disposed further radially inwardly and axially outwardly with respect to the rim assembly than said at least one hole of said first adapter portion when the tool is mounted on the rim assembly for mounting and supporting the tool on rim assemblies with the outer axial surface of the rim base axially disposed from the mounting flange, a pair of spaced apart gudgeon arms extending from said trunnion member for receiving a swivel thereon, and a spring plunger carried by said trunnion portion between said gudgeon arms for releasably retaining a swivel in one or more desired positions;
   a swivel adapter portion pivotally connected with said gudgeon arms of said trunnion adapter portion, at least one threaded hole in said swivel adapter portion constructed and arranged so that the axis of said at least one hole of said swivel adapter portion is generally axially parallel to the axis of rotation of the wheel rim and said one hole of said swivel portion is disposed further axially inwardly with respect to the rim assembly than said at least one hole of said trunnion adapter portion when the tool is mounted on the rim assembly for mounting and supporting the tool on rim assemblies with the mounting flange radially distal from and substantially coplanar with the outer axial surface of the rim base when said swivel adapter portion is positioned and retained by said spring plunger in an operative position; and at least one bolt for receipt in said at least one hole of the one of said adapter portions selected for use in mounting the tool on a rim assembly and said at least one bolt axially adjustable in said at least one hole of the selected adapter portion for abutting against the outer axial surface of the rim base to support the tool in a stable fashion when mounted on a rim assembly to prevent bodily tool rotation, hook disengagement and slippage during use and axially adjustable to facilitate positioning of the longitudinal axis of the tool generally parallel to the axis of rotation of the rim assembly when mounted on a wheel rim assembly to direct the demounting force transmitted to the tire bead by said pushing means generally inwardly against the tire bead to loosen the tire bead from the wheel rim assembly.

2. A tire bead loosening tool for loosening a bead of a tire from a rim assembly comprising:

a frame;

pushing means operatively associated with said frame for transmitting a force to loosen the bead of the tire from the rim assembly;

actuating means carried by said frame and operatively connected to said pushing means for supplying a motive force to said pushing means;

a hook carried by said frame for engaging with the rim to mount the tool of the rim assembly; and support means carried by said frame and constructed and arranged to be axially and radially adjustable with respect to a rim assembly when mounted on a rim assembly for supporting the tool in a stable manner to prevent bodily tool pivoting, hook engagement or slippage during use, said support means comprising:

a first adapter portion carried by said frame and adjacent said hook, at least one threaded hole in said first adapter portion constructed and arranged so that the axis of said at least one hole of said first adapter portion is generally axially parallel to the axis of rotation of the wheel rim when the tool is mounted on the rim assembly for mounting and supporting the tool on rim assemblies with a tool mounting flange generally proximal to and substantially coplanar with the other axial surface of a base of the rim assembly;

a second adapter portion carried by said frame, at least one threaded hole in said second adapter portion constructed and arranged so that the axis of said at least one hole of said second adapter portion is generally axially parallel to the axis of rotation of the wheel rim and said one hole of said second adapter is disposed radially inwardly and axially outwardly with respect to the rim assembly and said at least one hole of said first adapter portion when the tool is mounted on the rim assembly for mounting and supporting the tool on rim assemblies with the outer axial surface of the rim base axially disposed from the mounting flange;

a third adapter portion operatively associated with said frame, at least one threaded hole in said third adapter portion constructed and arranged so that the axis of said at least one hole of said third adapter portion is generally axially parallel to the axis of rotation of the wheel rim and disposed radially inwardly and axially inwardly with respect to the rim assembly and said at least one hole of said first adapter portion when the tool is mounted on the rim assembly for mounting and supporting the tool on rim assemblies with the mounting flange radially distal from and substantially coplanar with the outer axial surface of the rim base; and at least one bolt for receipt in said at least one hole of the one of said adapter portions selected for use in mounting the tool on a rim assembly and said at least one bolt axially adjustable in said at least one selected hole for abutting against the outer axial surface of the rim base to support the tool in a stable fashion when mounted on a rim assembly to prevent bodily tool rotation, hook disengagement and slippage during use and axially adjustable to facilitate positioning of the longitudinal axis of the tool generally parallel to the axis of rotation of the rim assembly when mounted on a wheel rim assembly to direct the demounting force transmitted to the tire bead by said pushing means generally inwardly against the tire bead to loosen the tire bead from the wheel rim assembly.

3. The tire bead loosening tool as set forth in claim 2 which also comprises said second adapter portion having a trunnion member with one end carried by said frame, a pair of spaced apart gudgeon arms formed from the free end of said trunnion member of said second adapter portion, a coaxial journal hole for coaxially receiving a pivot therethrough in each of said gudgeon arms, and said third adapter portion having a swivel member, a substantially right-angled arm extending from said swivel member, a journal hole in said arm for receiving a pivot therethrough, and a pivot coaxially received through said journal holes in said gudgeon arms and said arm of said swivel member for pivotally attaching said swivel member to said trunnion member.

4. The tire bead loosening tool as set forth in claim 3 which also comprises a threaded hole between said gudgeon arms, a spring plunger threadably received in said hole for engaging said swivel member of said third adapter portion to releasably retain said swivel member in a position for use in mounting and supporting the tool on a wheel rim assembly when said third adapter portion is selected for use and for releasably retaining said swivel member of said third adapter portion in an out-of-the-way position allowing said second adapter portion to be utilized to mount and support the tool on a wheel rim assembly when said second adapter portion is selected for use.

5. The tire bead loosening tool a set forth in claim 2 wherein said first adapter portion is affixed to said frame of the tool.

6. The tire bead loosening tool a set forth in claim 2 wherein said first adapter portion is integral with said frame of the tool.

7. The tire bead loosening tool as set forth in claim 2 wherein said first adapter portion comprises the end of said frame of the tool facing the outer axial surface of the rim assembly when the tool is mounted to the rim assembly.

8. The tire bead loosening tool a set forth in claim 2 wherein said second adapter portion is weldably attached to said frame of the tool.

9. The tire bead loosening tool as set forth in claim 2 wherein said second adapter portion is integral with said frame of the tool.

10. The pushing means as set forth in claim 2 which also comprises a clevis member reciprocatingly slidably disposed within said frame and having a base at one end operatively connected to said actuating means and a pair of spaced apart arms at the free end thereof for transmitting a bead loosening force from said actuating means against a tire sidewall to loosen the tire bead from a rim assembly for removal of the tire.

11. The tire bead loosening tool as set forth in claim 2 wherein said actuating means comprises a fluid actuated cylinder.

12. A mounting apparatus for mounting and supporting a tire bead loosening tool on a wheel rim assembly comprising;
- a first adapter portion adapted to be fixedly carried by a frame of the tool, at least one threaded hole in said first adapter portion constructed and arranged so that the axis of said at least one hole of said first adapter portion is generally axially parallel to the axis of rotation of the wheel rim when the tool is mounted on the rim assembly for mounting and supporting the tool in rim assemblies having a tool mounting flange generally proximal to and substantially coplanar with the outer axial surface of a base of the rim assembly;
- a second adapter portion fixedly connected to said first adapter portion, at least one threaded hole in said second adapter portion constructed and arranged so that the axis of said at least one hole of said second adaptor portion is generally axially parallel to the axis of rotation of the wheel rim and said one hole of said second portion is disposed radially inwardly and axially outwardly with respect to the rim assembly and said at least one hole of said first adapter portion when the tool is mounted on the rim assembly for mounting and supporting the tool on rim assemblies with the outer axial surface of the rim base axially disposed from the mounting flange;
- a third adapter portion movably connected to said second adapter portion, at least one threaded hole in said third adapter portion constructed and arranged so that the axis of said at least one hole of said third adapter portion is generally axially parallel to the axis of rotation of the wheel rim and said one hole of said third portion is disposed radially inwardly and axially inwardly with respect to the rim assembly and said at least one hole of said second adapter portion when the tool is mounted on the rim assembly for mounting and supporting the tool on rim assemblies with the mounting flange radially distal from and substantially coplanar with the outer axial surface of the rim base;
- said first and second adapter portions being arranged relative to one another in a tiered array radially of the wheel rim with said first portion constructed and arranged to be positioned radially outwardly of said second adapter portion when the tool is in a mounted position relative to the rim, said third adapter portion being movable to an operative position for presenting said at least one hole therein closer to the wheel rim and movable to an inoperative position to thereby enable said first and second adapter portions to be mounted closer to the wheel rim when the tool is in the mounted position on the rim; and
- at least one bolt for receipt in said at least one hole of the one of said adapter portions selected for use in mounting the tool on a rim assembly and said at least one bolt axially adjustable in said at least one selected hole for abutting against the outer axial surface of the rim base to support the tool in a stable fashion when mounted on a rim assembly to prevent bodily tool rotation, tool disengagement from the rim assembly and slippage during use and axially adjustable to facilitate positioning of the longitudinal axis of the tool generally parallel to the axis of rotation of the rim assembly when mounted on a wheel rim assembly to direct the demounting force transmitted to the tire bead by the tool generally inwardly against the tire bead to loosen the tire bead from the wheel rim assembly.

13. A tire bead loosening tool for loosening a bead of a tire from a rim assembly comprising:
- a frame;
- pushing means operatively associated with said frame for transmitting a force to loosen the bead of the tire from the rim assembly;
- actuating means carried by said frame and operatively connected to said pushing means for supplying a motive force to said pushing means;
- a hook carried by said frame for engaging with the rim to mount the tool on the rim assembly; and
- support means carried by said frame and constructed and arranged to be axially and radially adjustable with respect to a rim assembly when mounted on a rim assembly for supporting the tool in a stable manner to prevent bodily tool pivoting, hook disengagement or slippage during use, said support means comprising a fixed adapter means on said frame and a movable adapter means movably carried by said frame and both constructed and arranged to be axially adjustable with respect to a rim assembly for stable mounting thereon, whereby said fixed adapter portion may be selected for mounting the tool on the rim and for supporting the tool when mounted thereon during bead loosening and said movable adapter portion may be selectively positioned in an operable position closer to the rim than said fixed adapter means when said movable adapter portion is selected for mounting the tool on the rim and for supporting the tool when mounted thereon during bead loosening, said movable adapter means being movable to an inoperable position to enable said fixed adapter portion to be selected for use and positioned closer to the rim than when said movable adapter means is in said operable position thereof.

14. In an improved tire bead loosening tool for loosening a bead f a tire from a special wheel rim having at least one removable tire bead retaining side flange retained thereon by an annular radially outwardly extending side-flange retaining flange, the side flange bearing against the axially inner surface of the retaining flange when in its normal assembled position on the rim with an inflated tire bearing against the side flange and having a tool-receiving mounting flange at the axially inner edge of the retaining flange extending at least part of the distance around the circumference thereof, and the tire bead loosening tool having a frame, an actuator carried by the frame, a plunger pushing means driven by the actuator for imparting inward movement to the side flange and tire bead away from the retaining flange, and hook means mounted on the frame especially adapted for engaging the tool-receiving mounting flange in the retaining flange to hold the actuator in spaced relationship to the side flange during actuation of the plunger, the improvement comprising:
- a first adapter fixedly carried on the frame for mounting and supporting the tool on a wheel rim, a second adapter fixedly carried on the frame and positioned radially inwardly of said first adapter portion when the tool is mounted on the rim; and a third adapter pivotally carried on the frame and constructed and arranged to be selectively positioned in an operable position closer to the rim than said second adapter when said third adapter is selected for mounting and supporting the tool on the rim, said third adapter being pivotally movable to an inoperable position to enable one of said first and second adapters to be selected for use and position closer to the rim than when said third adapter is in said operable position thereof.

* * * * *